US009505957B2

(12) United States Patent
Schroeyers et al.

(10) Patent No.: US 9,505,957 B2
(45) Date of Patent: Nov. 29, 2016

(54) POLYOLEFIN ADHESIVE COMPOSITIONS COMPRISING NUCLEATING AGENTS FOR IMPROVED SET TIME

(71) Applicant: ExxonMobil Chemical Patents Inc., Baytown, TX (US)

(72) Inventors: Jurgen J. M. Schroeyers, Helchteren (BE); Joseph M. Delucia, Pittsburgh, PA (US); James N. Coffey, League City, TX (US); Marijke Vandevelde, Keerbergen (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/424,196

(22) PCT Filed: Aug. 2, 2013

(86) PCT No.: PCT/US2013/053403
§ 371 (c)(1),
(2) Date: Feb. 26, 2015

(87) PCT Pub. No.: WO2014/058521
PCT Pub. Date: Apr. 17, 2014

(65) Prior Publication Data
US 2015/0247068 A1 Sep. 3, 2015

Related U.S. Application Data

(60) Provisional application No. 61/713,182, filed on Oct. 12, 2012.

(51) Int. Cl.
*C09J 123/12* (2006.01)
*C09J 123/14* (2006.01)
*C08K 5/098* (2006.01)
*C09J 123/16* (2006.01)

(52) U.S. Cl.
CPC .............. *C09J 123/14* (2013.01); *C08K 5/098* (2013.01); *C09J 123/12* (2013.01); *C09J 123/16* (2013.01)

(58) Field of Classification Search
CPC ...... C09J 123/12; C09J 123/14; C08K 5/098
USPC ................................ 524/584, 570, 579, 582
See application file for complete search history.

(56) References Cited

U.S. PATENT DOCUMENTS 4,540,753 A    9/1985 Cozewith et al.
5,698,651 A   12/1997 Kawasaki et al.
(Continued)

FOREIGN PATENT DOCUMENTS

JP    H0948822    2/1997
JP    3570790     9/2004
(Continued)

OTHER PUBLICATIONS

Wheeler and Willis, Applied Spectroscopy, 1993, vol. 47, pp. 1128-1130.
(Continued)

*Primary Examiner* — Vu A Nguyen
(74) *Attorney, Agent, or Firm* — Priya G. Prasad

(57) ABSTRACT

An adhesive composition comprising a polyolefin composition comprising a homopolymer of propylene or a copolymer of propylene and ethylene or a $C_4$ to $C_{10}$ alpha-olefin, and a nucleating agent effective for decreasing the set time for the adhesive composition in comparison to an otherwise identical adhesive composition in which the nucleating agent is absent. The adhesive composition may have a Dot T-Peel of 1 Newton or more on Kraft paper.

19 Claims, 3 Drawing Sheets

(56) References Cited

U.S. PATENT DOCUMENTS

| | | | |
|---|---|---|---|
| 6,147,025 A | 11/2000 | Gillis et al. | |
| 6,465,551 B1 * | 10/2002 | Zhao | C07C 61/13 524/284 |
| 6,525,157 B2 | 2/2003 | Cozewith et al. | |
| 6,747,114 B2 * | 6/2004 | Karandinos | C09J 123/10 525/240 |
| 8,193,289 B2 | 6/2012 | Abhari et al. | |
| 2008/0081878 A1 | 4/2008 | Jiang et al. | |
| 2010/0059178 A1 | 3/2010 | Jiang et al. | |
| 2010/0076128 A1 * | 3/2010 | Abhari | C09J 123/10 524/112 |
| 2013/0060215 A1 * | 3/2013 | Knutson | C09J 123/142 604/366 |

FOREIGN PATENT DOCUMENTS

| | | | |
|---|---|---|---|
| JP | 2010111763 | 5/2010 | |
| JP | 2011170254 | 9/2010 | |
| JP | 2011042780 | 3/2011 | |
| WO | 2010/027099 | 3/2010 | |
| WO | WO 2012051239 A1 * | 4/2012 | C08L 23/10 |
| WO | 2012/068576 | 5/2012 | |

OTHER PUBLICATIONS

Verstrate et al., Macromolecules, 1988, vol. 21, pp. 3360.

* cited by examiner

POLYOLEFIN ADHESIVE COMPOSITIONS COMPRISING NUCLEATING AGENTS FOR IMPROVED SET TIME

CROSS-REFERENCES TO RELATED APPLICATIONS

This application is a National Stage Application of International Application No. PCT/US2013/053403, filed Aug. 2, 2013, and claims the benefit of U.S. Provisional Application No. 61/713,182, filed Oct. 12, 2012, the disclosures of which are hereby incorporated by reference in their entireties.

FIELD OF INVENTION

The invention relates to a polyolefin adhesive composition that comprises one or more nucleating agents for improving the set time of the finished adhesive.

BACKGROUND

Historically, packaging grade hot melt adhesive ("HMA") formulations include a base polymer, and one or more waxes and tackifiers. In addition to basic adhesive bond strength performance, the set-time of the HMA is a key parameter for packaging grade HMAs. This is because lower set times enable faster packaging line speeds.

Set-time is the minimum time interval, after bonding of two substrates, during which the cohesive strength of the bond becomes stronger than the joint stress (often called the pop open force). Set-time thus represents the time necessary to cool down the HMA and obtain a good bond. Open-time is the maximum time interval, after application of the liquid HMA, during which a second substrate can be brought into contact with the molten adhesive and a good bond will be formed. Generally, once the adhesive has cooled to a certain temperature, it is no longer possible to make a bond. Usually HMA formulators attempt to design HMA formulations that have long open time and short setting times, a balance which is difficult to achieve.

Conventional HMA formulations contain up to 30% wax to obtain good set times. Waxes however do not take part in actual adhesive performance; by removing the wax, overall adhesive performance can be enhanced. It would therefore be desirable to provide a hot melt adhesive formulation requiring less wax, preferably little to no wax and higher base polymer loading.

SUMMARY

The foregoing and/or other challenges are addressed by the methods and products disclosed herein.

In one aspect, an adhesive composition is provided that comprises a polyolefin composition comprising a homopolymer of propylene or a copolymer of propylene and ethylene or a $C_4$ to $C_{10}$ alpha-olefin, and a nucleating agent effective for decreasing the set time for the adhesive composition in comparison to an otherwise identical adhesive composition in which the nucleating agent is absent. The nucleating agent may be an organic metal salt. The adhesive composition has a Dot T-Peel of 1 Newton or more on Kraft paper.

In another aspect, an adhesive composition is provided that comprises a polyolefin composition comprising a homopolymer of propylene or a copolymer of propylene and ethylene or a $C_4$ to $C$ alpha-olefin, and a nucleating agent effective for decreasing the set time for the adhesive composition in comparison to an otherwise identical adhesive composition in which the nucleating agent is absent, wherein the nucleating agent is an inorganic solid particle or an organic component having a crystallization temperature greater than that of the polyolefin composition. The adhesive composition has a Dot T-Peel of 1 Newton or more on Kraft paper.

In yet another aspect, an adhesive composition is provided that comprises a polyolefin composition comprising a homopolymer of propylene or a copolymer of propylene and ethylene or a $C_4$ to $C_{10}$ alpha-olefin; and a nucleating agent effective for decreasing the set time for the adhesive composition by at least 10% in comparison to an otherwise identical adhesive composition in which the nucleating agent is absent. The adhesive composition has a Dot T-Peel of 1 Newton or more on Kraft paper.

These and other aspects of the present inventions are described in greater detail in the following detailed description and are illustrated in the accompanying drawings.

DETAILED DESCRIPTION

Figure 1:
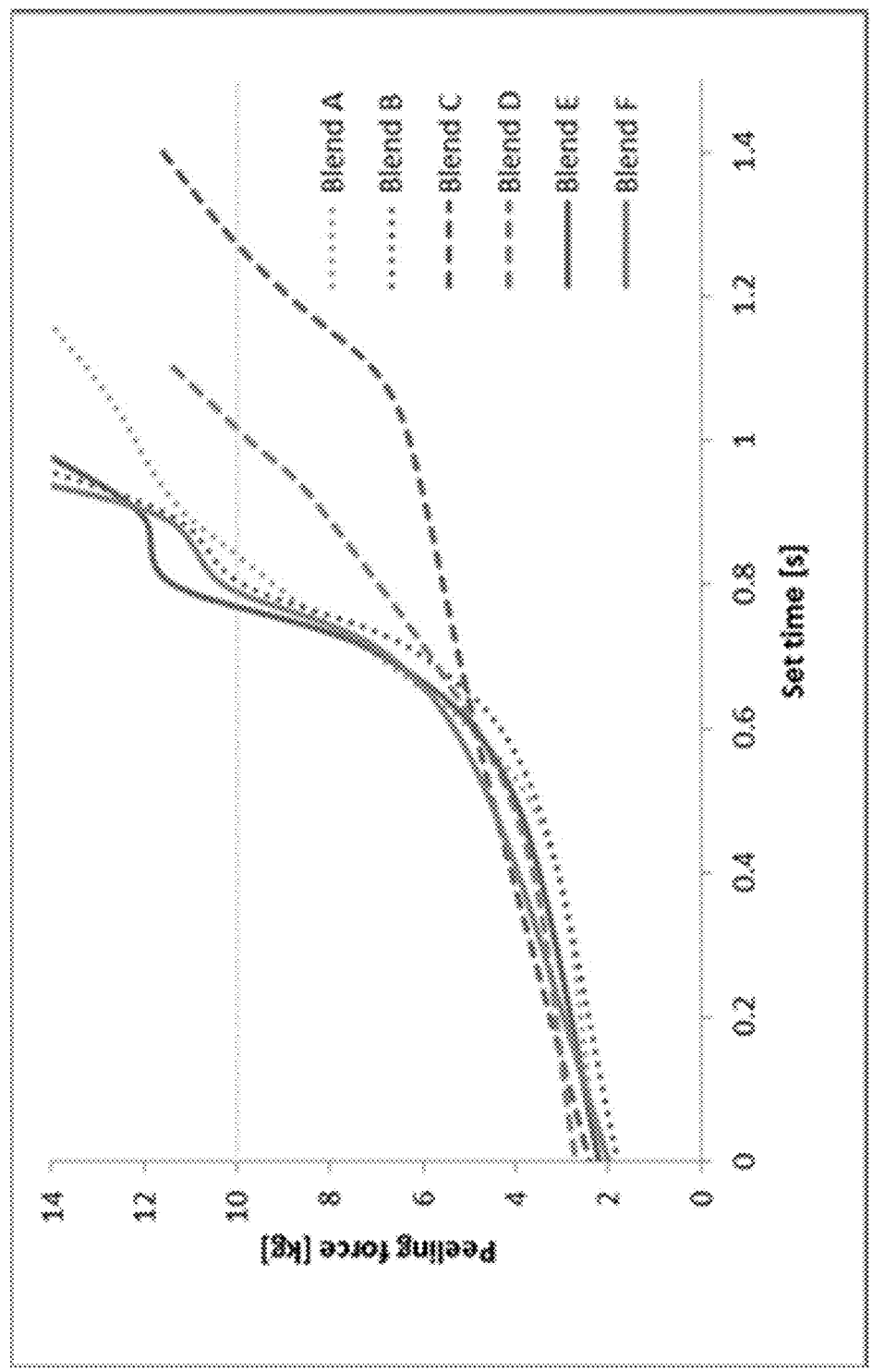
FIG. 1 is a graphical depiction illustrating various adhesive compositions building strength over time.

Adhesive formulations are disclosed herein that enable enhanced adhesive properties and deliver excellent set-times while maintaining long open times. In any embodiment, the formulations enable the usage of higher polymer loads in the finished adhesive, thereby delivering enhanced adhesive strength. In doing so, the formulations may reduce adhesive density and provide a pathway for reducing the mass and volume of adhesive that must be applied on packaging lines. By lowering adhesive volumes, set time may be further improved due to the fact that the reduced thermal mass requires less time to cool.

The formulations disclosed herein may deliver improved set times while maintaining long open times by the incorporation of nucleating agents in the adhesive formulation. In any embodiment, the formulation may include a polyolefin composition comprising a homopolymer of propylene or a copolymer of propylene and ethylene or a $C_4$ to $C_{10}$ alpha-olefin. In any embodiment, the polyolefin composition may comprise a copolymer of propylene and ethylene.

In any embodiment, the nucleating agent may be effective for decreasing the set time for the adhesive composition, preferably by at least 10%, in comparison to an otherwise identical adhesive composition in which the nucleating agent is absent. In any embodiment, the nucleating agent may be effective to increase the onset crystallization temperature of the polyolefin composition relative to the adhesive composition in which the nucleating agent is absent. In any embodiment, the nucleating agent may be effective to increase the onset crystallization temperature of the polyolefin composition by at least 10° C. relative to the adhesive composition in which the nucleating agent is absent.

In any embodiment, the nucleating agent may be a metal salt. In any embodiment, the nucleating agent may be an organic compound having a crystallization temperature greater than the crystallization temperature of the polyolefin composition. In any embodiment, the nucleating agent may be selected from the group consisting of sodium benzoate, talc, glycerol alkoxide salts, cyclic carboxylic acid salts, bicyclic carboxylic acid salts, glycerolates, and hexahydrophthalic acid salts. In any embodiment, the nucleating agent comprises a salt of bicyclo[2.2.1]heptane dicarboxylate.

Advantageously, the improvement in set-time enabled by the formulations disclosed herein may be achieved using reduced amounts of wax, or more preferably little to no wax. In any embodiment, the adhesive composition may comprise about 25 wt % wax or less, or about 5 wt % wax or less, or substantially no wax.

The formulations disclosed herein are broadly applicable to multi-modal polymer blends that have a combination of properties that are beneficial for use in adhesive compositions. Generally, the nucleating agents may be employed with polyolefin compositions having multi-modal polymer blends in which the blend includes at least two polymers having a difference of heat of fusion of about 20 J/g or more, or about 30 J/g or more. For example, the nucleating agent may be employed to reduce the set time of a multi-modal polymer blend in which one polymer has a heat of fusion of about 50 J/g or less, and a second polymer has a heat of fusion of about 30 J/g or more. For example, the nucleating agent may be employed to reduce the set time of a multi-modal polymer blend in which one polymer has a heat of fusion of about 65 J/g to about 85 J/g, and a second polymer has a heat of fusion of about 10 J/g to about 30 J/g. The nucleating agent may also be employed to reduce the set time of a multi-modal polymer blend in which one polymer has a heat of fusion of 80 J/g or more, and the second polymer has a heat of fusion of about 50 J/g or less. The nucleating agent may also be employed to reduce the set time of a multi-modal polymer blend in which one polymer has a heat of fusion of 50 J/g or more, and the second polymer has a heat of fusion of about 15 J/g or less. In any embodiment, the weight ratio of first polymer to second polymer present in the blend may be 10:90 to 90:10, or 20:80 to 80:20, or 30:70 to 70:30, or 40:60 to 60:40.

The formulations disclosed herein have a Dot-T Peel of 1 Newton or more on Kraft Paper. Dot T-Peel as used herein is determined according to ASTM D 1876, except that the specimen is produced by combining two 1 inch by 3 inch (2.54 cm×7.62 cm) substrate cut outs with a dot of adhesive having a volume that, when compressed under a 500-gram weight, occupies about 1 square inch of area (1 inch=2.54 cm). Once made, all the specimens may be pulled apart in side by side testing at a rate of 2 inches per minute by an apparatus that measures the destructive force that is applied. The maximum force achieved for each sample tested is the Dot T-Peel. A Dot T-Peel of 1 Newton may be considered a minimum performance requirement for an adhesive. Generally, an adhesive composition that demonstrates any measurable fiber tear has a Dot T-Peel of at least 1 Newton.

A. POLYOLEFIN COMPOSITION

Polymers employed in any of the polyolefin compositions of the invention are preferably derived from one or more monomers selected from the group consisting of propylene, ethylene, $C_4$ to $C_{20}$ linear or branched olefins, and diolefins (particularly, $C_4$ to $C_{10}$ olefins). The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction.

Preferably, the polymer is predominantly propylene. Preferred comonomers include ethylene, butene, hexene, and octene, with ethylene being the most preferred comonomer. For propylene-based polymers, the crystallinity and heat of fusion of the polymer are affected by the comonomer content and the sequence distribution of the comonomer within the polymer. Generally, increased levels of comonomer will reduce the crystallinity provided by the crystallization of stereoregular propylene-derived sequences.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Various test methods including GPC measurements methods and methods for determining ethylene content by NMR and the DSC measurements are described in U.S. Pat. No. 6,525,157, which is incorporated by reference herein in its entirety.

Preferred polymers are semi-crystalline propylene-based polymers. In any embodiment, the polymers may have a relatively low molecular weight, preferably about 100,000 g/mole or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries.

"Polypropylene" as used herein includes homopolymers and copolymers of propylene or mixtures thereof. Products that include one or more propylene monomers polymerized with one or more additional monomers may be more commonly known as random copolymers (RCP) or impact copolymers (ICP). Impact copolymers are also known in the art as heterophasic copolymers. "Propylene-based", as used herein, is meant to include any polymer comprising propylene, either alone or in combination with one or more comonomers, in which propylene is the major component (i.e., greater than 50 mole % propylene). In any embodiment, the polymer may be a propylene-based elastomer. The term "elastomer" as used herein refers to a polymer which exhibits elasticity, i.e., the ability to regain shape after deformation, is above its glass transition temperature at room temperature, and exhibits elongation at break of preferably at least 80%, or more preferably at least 100%, or even more preferably at least 200%.

In any embodiment, the polyolefin composition may comprise one or more propylene-based polymers, which comprise propylene and from about 5 mole % to about 30 mole % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the polyolefin composition may include at least about 5 mole %, at least about 6 mole %, at least about 7 mole %, or at least about 8 mole %, or at least about 10 mole %, or at least about 12 mole % ethylene-derived or hexene-derived units. In those or other embodiments, the copolymers may include up to about 30 mole %, or up to about 25 mole %, or up to about 22 mole %, or up to about 20 mole %, or up to about 19 mole %, or up to about 18 mole %, or up to about 17 mole % ethylene-derived or hexene-derived units, where the percentage by weight is based upon the total weight of the propylene-derived and α-olefin derived units. Stated another way, the polyolefin composition may include at least about 70 mole %, or at least about 75 mole %, or at least about 80 mole %, or at least about 81 mole % propylene-derived units, or at least about 82 mole % propylene-derived units, or at least about 83 mole % propylene-derived units; and in these or other embodiments, the copolymers may include up to about 95 mole %, or up to about 94 mole %, or up to about 93 mole %, or up to about 92 mole %, or up to about 90 mole %, or up to about 88 mole % propylene-derived units, where the percentage by weight is based upon the total weight of the propylene-derived and alpha-olefin derived units. In any embodiment, the polyolefin composition may comprise from about 5 mole % to about 25 mole % ethylene-derived or hexene-derived units, or from about 8 mole % to about 20 mole % ethylene-derived or hexene-derived units, or from about 12 mole % to about 18 mole % ethylene-derived or hexene-derived units.

The polyolefin composition may be characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the polyolefin composition (as determined by DSC) may be less than about 115° C., or less than about 110° C., or less than about 100° C., or less than about 90° C. In any embodiment, the Tm of the polyolefin composition may be greater than about 25° C., or greater than about 30° C., or greater than about 35° C., or greater than about 40° C.

In one or more embodiments, the first crystallization temperature (Tc1) of the polyolefin composition (as determined by viscosity curve) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc1 of the polyolefin composition is greater than about 0° C., or greater than about 5° C., or greater than about 10° C., or greater than about 15° C., or greater than about 20° C.

In other embodiments, the Tc1 lower limit of the polyolefin composition may be 0° C., 5° C., 10° C., 20° C., 30° C., 40° C., 50° C., 60° C., and 70° C.; and the Tc1 upper limit temperature may be 100° C., 90° C., 80° C., 70° C., 60° C., 50° C., 40° C., 30° C., 25° C., and 20° C. with ranges from any lower limit to any upper limit being contemplated.

In one or more embodiments, the second crystallization temperature (Tc2) of the polyolefin composition (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc2 of the polymer is greater than about 0° C., or greater than about 5° C., or greater than about 10° C., or greater than about 15° C., or greater than about 20° C.

In other embodiments, the Tc2 lower limit of the polyolefin composition may be 0° C., 5° C., 10° C., 20° C., 30° C., 40° C., 50° C., 60° C., and 70° C.; and the Tc2 upper limit temperature may be 100° C., 90° C., 80° C., 70° C., 60° C., 50° C., 40° C., 30° C., 25° C., and 20° C. with ranges from any lower limit to any upper limit being contemplated.

In one or more embodiments, the polyolefin composition may have a density of from about 0.85 $g/cm^3$ to about 0.92 $g/cm^3$, or from about 0.86 $g/cm^3$ to about 0.90 $g/cm^3$, or from about 0.86 $g/cm^3$ to about 0.89 $g/cm^3$ at room temperature as measured per the ASTM D-792 test method.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Techniques for determining the molecular weight may be found in U.S. Pat. No. 4,540,753 (Cozewith, Ju, and Verstrate) and in Macromolecules, 1988, Vol. 21, p. 3360 (Verstrate et al.). For example, molecular weight may be determined by size exclusion chromatography (SEC) by using a Waters 150 gel permeation chromatograph equipped with the differential refractive index detector and calibrated using polystyrene standards.

In one or more embodiments, the polyolefin composition may have a viscosity (also referred to a Brookfield viscosity or melt viscosity), measured at 190° C. and determined according to ASTM D-3236 from about 100 cP to about 1,000,000,000 cP, or from about 1,000 to about 100,000,000 cP, or from about 2,000 to about 10,000,000 cP, or from about 2,500 to about 7,500,000 cP, or from about 3,000 to about 5,000,000 cP, or from about 3,500 to about 3,000,000 cP, or from about 4,000 to about 1,000,000 cP, or from about 4,500 to about 750,000 cP, or from about 5,000 to about 500,000 cP, or from about 5,500 to about 450,000 cP, or from about 6,000 to about 400,000 cP.

In one or more embodiments, the polyolefin composition may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the polyolefin composition may be characterized by an viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

In any embodiment, one or more of the polymers described herein may be blended with another polymer, such as another polymer described herein, to produce a physical blend of polymers, preferably a multimodal polymer blend. The term "blend" as used herein refers to a mixture of two or more polymers. The term "multimodal" as used herein refers to a blend of two or more distinct polymer species in which each species is distinguishable from another species present in the blend on the basis of at least one chemical or physical property selected from the group consisting of molecular weight, melt viscosity, comonomer content, heat of fusion, and crystallinity.

In any embodiment, the first polymer and second polymer of the blend may have a difference in heat of fusion of about 20 J/g or more, or more preferably about 30 J/g or more. In any embodiment, the first polymer may have a heat of fusion of about 50 J/g or more and the second polymer may have a heat of fusion of about 30 J/g or less. For example, the first polymer may have a heat of fusion of about 65 to about 85 J/g and the second polymer may have a heat of fusion of about 10 J/g to about 20 J/g. The first and second polymer may each be, independently, a homopolymer of propylene or a copolymer of propylene and ethylene or a $C_4$ to $C_{10}$ olefin. In any embodiment, each polymer of the blend may have a propylene content of more than 50 mole %.

Particularly advantageous adhesive properties can be achieved by employing a multimodal polymer blend that employs an exceptionally low crystalline propylene-based polymer in combination with a higher crystalline propylene-based polymer. In any embodiment, the exceptionally low crystalline propylene-based polymer may be a homopolymer of propylene or a copolymer of propylene and ethylene or a $C_4$ to $C_{10}$ olefin, and has a heat of fusion of about 15 J/g or less. In any embodiment, the exceptionally low crystalline propylene-based polymer may be a homopolymer of propylene or a copolymer of propylene and ethylene, butene, hexene, or octene. In any embodiment, the exceptionally low crystalline propylene-based may be a homopolymer of propylene or a copolymer of propylene and ethylene. In any embodiment, the exceptionally low crystalline propylene-based polymer may have a propylene content of more than 50 mole %.

In any embodiment, the higher crystalline propylene-based polymer that is blended with the exceptionally low crystalline propylene-based polymer may be a homopolymer of propylene or a copolymer of propylene and ethylene or a $C_4$ to $C_{10}$ olefin, and has a heat of fusion of about 50 J/g or more, or 55 J/g or more, or 60 J/g or more, or 65 J/g or more, or 75 J/g or more. In an exemplary embodiment, the higher crystalline propylene-based polymer has a heat of fusion of about 65 J/g to about 85 J/g. In any embodiment, the higher crystalline propylene-based polymer may be a homopolymer of propylene or a copolymer of propylene and ethylene, butene, hexene, or octene. In any embodiment, the higher crystalline propylene-based polymer is a homopolymer of propylene or a copolymer of propylene and ethylene. In any embodiment, the higher crystalline propylene-based polymer may have a propylene content of more than 50 mole %.

In addition, particularly advantageous adhesive properties can be achieved by using an exceptionally high crystalline propylene-based polymer in combination with a lower crystalline propylene-based polymer. In any embodiment, the exceptionally high crystalline propylene-based polymer may be a homopolymer of propylene or a copolymer of propylene and ethylene or a $C_4$ to $C_{10}$ olefin, and has a heat of fusion of about 80 J/g or more. In any embodiment, the exceptionally high crystalline propylene-based polymer may be a homopolymer of propylene or a copolymer of propylene and ethylene, butene, hexene, or octene. In any embodiment, the exceptionally high crystalline propylene-based polymer is a homopolymer of propylene or a copolymer of propylene and ethylene. In any embodiment, the exceptionally high crystalline propylene-based polymer may have a propylene content of more than 50 mole %.

In any embodiment, the lower crystalline propylene-based polymer that is blended with the exceptionally high crystalline propylene-based polymer may be a homopolymer of propylene or a copolymer of propylene and ethylene or a $C_4$ to $C_{10}$ olefin, and has a heat of fusion of about 50 J/g or less, or more preferably about 25 J/g or less. In an exemplary embodiment, the lower crystalline propylene-based polymer has a heat of fusion of about 10 Jig to about 20 J/g. In any embodiment, the lower crystalline propylene-based polymer may be a homopolymer of propylene or a copolymer of propylene and ethylene, butene, hexene, or octene. In any embodiment, the lower crystalline propylene-based polymer is a homopolymer of propylene or a copolymer of propylene and ethylene. In any embodiment, the lower crystalline propylene-based polymer may have a propylene content of more than 50 mole %. In any embodiment, the lower crystalline propylene-based polymer has a heat of fusion of 45 J/g or less, 40 J/g or less, 35 J/g or less, or 30 J/g or less.

The relative weight percentages of polymers of blend may vary depending on the application of the hot melt adhesive formulation. In any embodiment, the higher crystalline polymer may about 10% to about 90% of the polymer blend, or about 20% to about 80% of the polymer blend, or about 30% to about 70% of the polymer blend, or about 40% to about 60% of the polymer blend.

Nucleating Agents

The term "nucleating agent" as used herein refers to a component that when added to the adhesive composition increases the temperature at which the polyolefin composition begins to solidify or crystallize from a molten state. Without being bound by theory, it is believed that such a component that is compatible with the polyolefin composition forms nucleation sites which promote the alignment and crystallization of the polyolefin polymer molecules adjacent to the nucleation sites. In any embodiment, the nucleating agent may be a solid particle having a size suitable for promoting a nucleating effect. In any embodiment, the nucleating agent may be a polymer that is compatible with the polyolefin and that crystallizes at a higher temperature than the polyolefin to promote a nucleating effect when the adhesive composition cools from a molten state.

In any embodiment, the nucleating agent may be selected from the group consisting of sodium benzoate, talc, glycerol alkoxide salts, cyclic carboxylic acid salts, bicyclic carboxylic acid salts, glycerolates, and hexahydrophtalic acid salts. Nucleating agents include HYPERFORM™ additives, such as HPN-68, HPN-68L, HPN-20, HPN-20E, MILLAD™ additives (e.g., MILLAD™ 3988) (Milliken Chemicals, Spartanburg, S.C.) and organophosphates such as NA-11 and NA-21 (Amfine Chemicals, Allendale, N.J.). In any embodiment, the nucleating agent may comprise at least one bicyclic carboxylic acid salt. In any embodiment, the nucleating agent is bicycloheptane dicarboxylic acid, disodium salt such as bicyclo[2.2.1]heptane dicarboxylate. In any embodiment, the nucleating agent may be a blend of components comprising bicyclo[2.2.1]heptane dicarboxylate, disodium salt, 13-docosenamide, and amorphous silicon dioxide. In any embodiment, the nucleating agent may be cyclohexanedicarboxylic acid, calcium salt or a blend of cyclohexanedicarboxylic acid, calcium salt, and zinc stearate.

In any embodiment, the nucleating agent may be a metal salt of Formula (I),

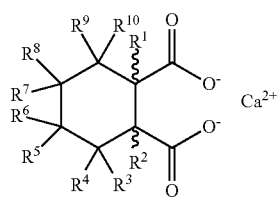

Formula (I)

wherein $R^1$ to $R^{10}$ are independently of one another a hydrogen atom, an alkyl group having 1 to 9 carbon atoms, a hydroxyl group, an alkoxy group having 1 to 9 carbon atoms, an amino group, an alkylamine group having 1 to 9 carbon atoms, a halogen atom, a phenyl group, or a group represented by the formula, R—(R'—O)n-, R being an alkyl group having 1 to 3 carbon atoms, R' being an alkylene group having 2 or 3 carbon atoms, and n being an integer of 1 to 4; any two alkyl groups of $R^1$ to $R^{10}$ may be linked to each other, thereby forming a carbon ring having 3 to 6 carbon atoms; and $R^1$ and $R^2$ have a trans or cis configuration with each other.

Examples of $R^1$ to $R^{10}$ in formula (I) representing the metal salt are a methyl group, an ethyl group, a propyl group, a methoxy group, an ethoxy group, a methylamino group, an ethylamino group, a dimethylamino group, a diethylamino group, a fluorine atom, a chlorine atom, a bromine atom, and an iodine atom. Examples of the group represented by the formula, R—(R'—O)n-, contained in formula (I) are as follows: CH3-(CH2CH2-O)—, CH3(CH2CH2-O)2-, CH3(CH2CH2-O)3-, CH3(CH2CH2-O).sub.4-, C2H5-(CH2CH2-O)—, C2H5(CH2CH2-O)2-, C2H5(CH2CH2-O)3-, C3H7-(CH2CH2-)-, C3H7(CH2CH2-O) 2-, C3H7(CH2CH2-O)3-, CH3-(CH(CH3)CH2-O)—, CH3(CH(CH3)CH2-O)2-, C2H5-(CH(CH3)CH2-O)—, and C2H5(CH(CH3)CH2-O)2-.

$R^1$ to $R^{10}$ are independently of one another preferably a hydrogen atom or an alkyl group having 1 to 3 carbon atoms such as a methyl group, an ethyl group and a propyl group. A more preferable metal salt is calcium 1,2-cyclohexanedicarboxylate represented by the following formula:

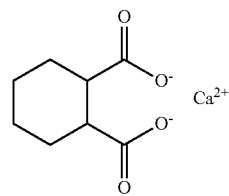 [SMILES: O=C([O-])C1CCCCC1C(=O)[O-] ; [Ca+2]]

Further examples of the metal salt represented by Formula (I) are as follows:

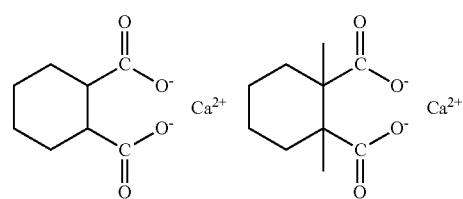

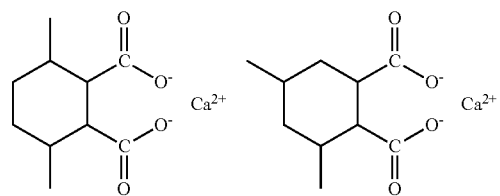

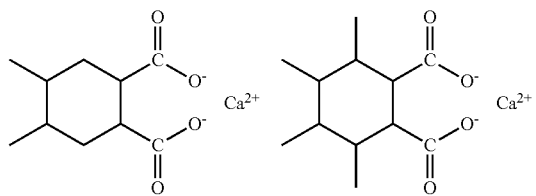

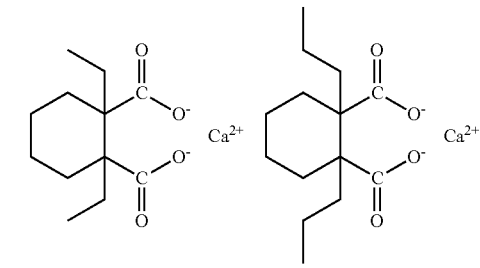

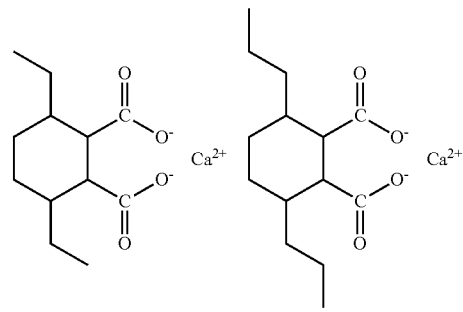

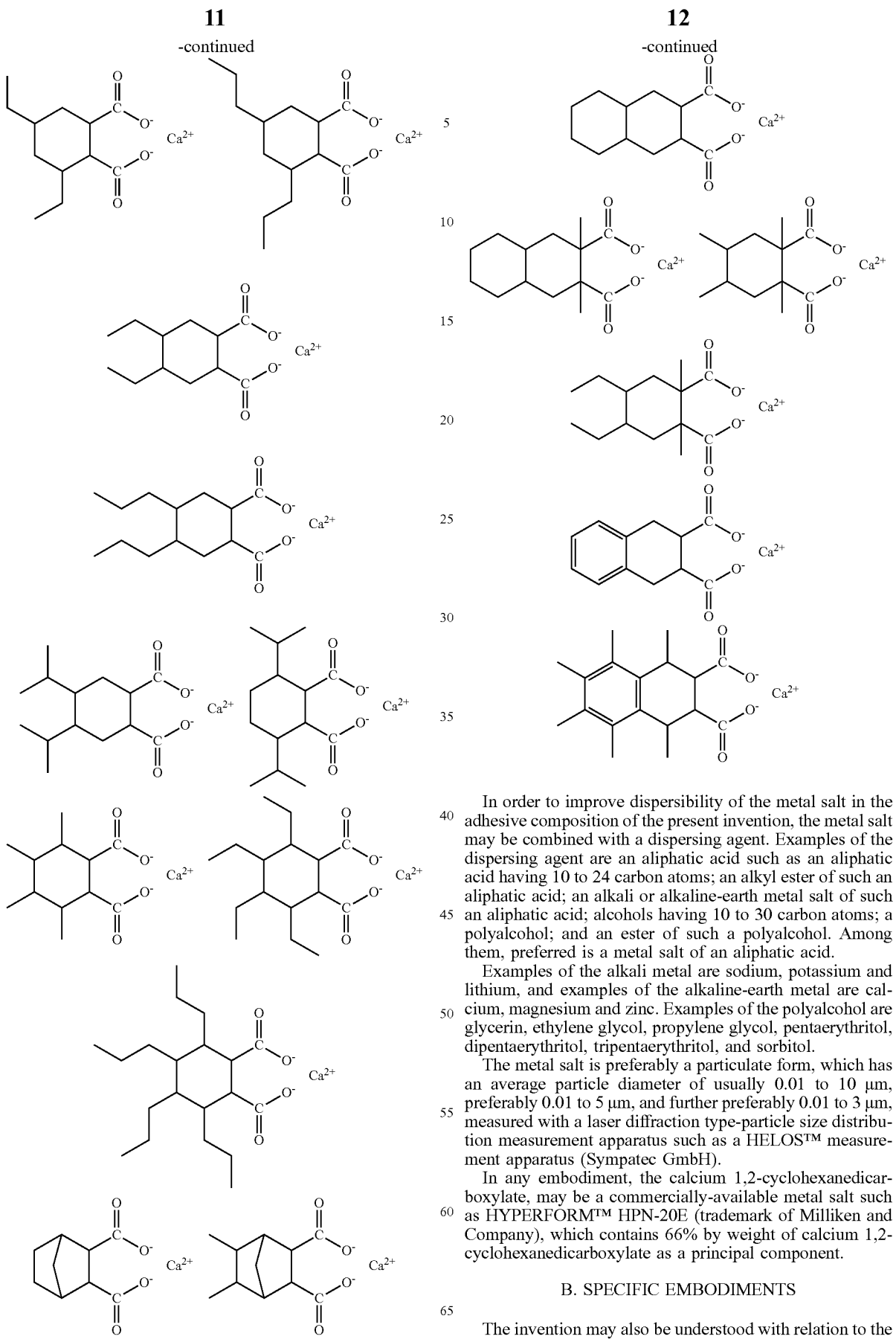

In order to improve dispersibility of the metal salt in the adhesive composition of the present invention, the metal salt may be combined with a dispersing agent. Examples of the dispersing agent are an aliphatic acid such as an aliphatic acid having 10 to 24 carbon atoms; an alkyl ester of such an aliphatic acid; an alkali or alkaline-earth metal salt of such an aliphatic acid; alcohols having 10 to 30 carbon atoms; a polyalcohol; and an ester of such a polyalcohol. Among them, preferred is a metal salt of an aliphatic acid.

Examples of the alkali metal are sodium, potassium and lithium, and examples of the alkaline-earth metal are calcium, magnesium and zinc. Examples of the polyalcohol are glycerin, ethylene glycol, propylene glycol, pentaerythritol, dipentaerythritol, tripentaerythritol, and sorbitol.

The metal salt is preferably a particulate form, which has an average particle diameter of usually 0.01 to 10 μm, preferably 0.01 to 5 μm, and further preferably 0.01 to 3 μm, measured with a laser diffraction type-particle size distribution measurement apparatus such as a HELOS™ measurement apparatus (Sympatec GmbH).

In any embodiment, the calcium 1,2-cyclohexanedicarboxylate, may be a commercially-available metal salt such as HYPERFORM™ HPN-20E (trademark of Milliken and Company), which contains 66% by weight of calcium 1,2-cyclohexanedicarboxylate as a principal component.

B. SPECIFIC EMBODIMENTS

The invention may also be understood with relation to the following specific embodiments:

Paragraph A: An adhesive composition comprising:
a polyolefin composition comprising a homopolymer of propylene or a copolymer of propylene and ethylene or a $C_4$ to $C_{10}$ alpha-olefin;
a nucleating agent effective for decreasing the set time for the adhesive composition by at least 10% in comparison to an otherwise identical adhesive composition in which the nucleating agent is absent;
wherein the adhesive composition has a Dot T-Peel of 1 Newton or more on Kraft paper.

Paragraph B: The adhesive composition of Paragraph A, wherein the nucleating agent is a metal salt.

Paragraph C: The adhesive composition of Paragraph A, wherein the nucleating agent is an organic compound having a crystallization temperature greater than the crystallization temperature of the polyolefin composition.

Paragraph D: The adhesive composition of any of Paragraphs A-C, wherein the nucleating agent is effective to increase the onset crystallization temperature of the polyolefin composition relative to the adhesive composition in which the nucleating agent is absent.

Paragraph E: The adhesive composition of any of Paragraphs A-D, wherein the nucleating agent is effective to increase the onset crystallization temperature of the polyolefin composition by at least 10° C. relative to the adhesive composition in which the nucleating agent is absent.

Paragraph F: The adhesive composition of any of Paragraphs A-E, wherein the nucleating agent may be selected from the group consisting of sodium benzoate, talc, glycerol alkoxide salts, cyclic carboxylic acid salts, bicyclic carboxylic acid salts, glycerolates, and hexahydrophtalic acid salts.

Paragraph G: The adhesive composition of Paragraph F, wherein the nucleating agent comprises a salt of bicyclo[2.2.1]heptane dicarboxylate.

Paragraph H: The adhesive composition of any of Paragraphs A-G, wherein the adhesive composition comprises about 25 wt % wax or less.

Paragraph I: The adhesive composition of any of Paragraphs A-H, wherein the adhesive composition comprises about 5 wt % wax or less.

Paragraph J: The adhesive composition of any of Paragraphs A-G, wherein the adhesive composition comprises substantially no wax.

Paragraph K: The adhesive composition of any of Paragraphs A-J, wherein the polyolefin composition comprises a copolymer of propylene and ethylene.

Paragraph L: The adhesive composition of any of Paragraphs A-K, wherein the polyolefin composition comprises a blended multimodal polymer.

Paragraph M: The adhesive composition of Paragraph L, wherein the blended multimodal polymer comprises a first polymer, wherein the first polymer is a copolymer of propylene and ethylene or a $C_4$ to $C_{10}$ olefin; and a second polymer, wherein the second polymer is a copolymer of propylene and ethylene or a $C_4$ to $C_{10}$ olefin.

Paragraph N: The adhesive composition of Paragraph M, wherein the first polymer and second polymer have a difference in heat of fusion of about 20 J/g or more.

Paragraph O: The adhesive composition of Paragraph N, wherein the difference in heat of fusion between the first polymer and second polymer is about 30 J/g or more.

Paragraph P: The adhesive composition of Paragraph N, wherein the first polymer has a heat of fusion of about 50 J/g or more, and the second polymer has a heat of fusion of about 30 J/g or less.

Paragraph Q: The adhesive composition of Paragraph P, wherein the first polymer has a heat of fusion of about 65 J/g to about 85 J/g and the second polymer has a heat of fusion of about 10 J/g to about 30 J/g.

Paragraph R: The adhesive composition of Paragraph O, wherein the first polymer has a heat of fusion of about 80 J/g or more, and the second polymer has a heat of fusion of about 50 J/g or less.

Paragraph S: The adhesive composition of Paragraph O, wherein the first polymer has a heat of fusion of about 50 J/g or more, and the second polymer has a heat of fusion of about 15 J/g or less.

Paragraph T: An adhesive composition comprising:
a polyolefin composition comprising a homopolymer of propylene or a copolymer of propylene and ethylene or a $C_4$ to $C_{10}$ alpha-olefin;
a nucleating agent effective for decreasing the set time for the adhesive composition in comparison to an otherwise identical adhesive composition in which the nucleating agent is absent, wherein the nucleating agent is an inorganic solid particle or an organic component having a crystallization temperature greater than that of the polyolefin composition; wherein the adhesive composition has a Dot T-Peel of 1 Newton or more on Kraft paper.

Paragraph U: An adhesive composition comprising:
a polyolefin composition comprising a homopolymer of propylene or a copolymer of propylene and ethylene or a $C_4$ to $C_{10}$ alpha-olefin; a nucleating agent effective for decreasing the set time for the adhesive composition in comparison to an otherwise identical adhesive composition in which the nucleating agent is absent, wherein the nucleating agent is an organic metal salt; and
wherein the adhesive composition has a Dot T-Peel of 1 Newton or more on Kraft paper.

Paragraph V: The adhesive composition of any of Paragraphs A-U, wherein the nucleating agent is present in an amount of 200 to 5000 ppm.

EXAMPLE ONE

Six adhesive compositions (A-F) were made by preheating components to 180° C. in a glass beaker and blended by simple manual stirring using a spatula. The composition of each adhesive is described in TABLE 1. Unless otherwise specified, the numerical values are expressed in weight percentages. Each of the compositions was analyzed to determine its open time, set time, fiber tear at room temperature and under refrigeration, and viscosity. The results of this analysis are also reported in TABLE 1.

As used in this Example, the following terms have the following meanings:

"PBE1" is a propylene based elastomer with a viscosity at 190° C. of 1122 mPas and a heat of fusion of 45 J/g.

"PBE2" is a propylene based elastomer with a viscosity at 190° C. of 865 mPas and a heat of fusion of 41 J/g.

"Linxar™ 127" is a polyolefin adhesive base polymer resin available from ExxonMobil Chemical Company.

"Escorene™ UL 40028" is an ethylene vinyl acetate copolymer resin available from ExxonMobil Chemical Company.

"Escorene™ UL 02528" is an ethylene vinyl acetate copolymer resin available from ExxonMobil Chemical Company.

"Sasolwax™ C80" is a Fischer-Tropsch wax having a melting point of 80° C. available from Sasol wax a division of Sasol limited, South Africa.

"Sasolwax™ H1" is a Fischer-Tropsch wax having a melting point of 98° C. available from Sasol wax a division of Sasol limited, South Africa.

"Milliken™ HPN 20e" is a metal salt of 1,2-cyclohexanedicarboxylate available from Milliken Chemical, a division of Milliken & Company.

"Escorez™ 2206 LC" is an aromatic modified aliphatic hydrocarbon resin expressing a softening point of 92° C. available from ExxonMobil Chemical Company.

"MAPP 40" is a maleated polypropylene with a softening point of 300-350 deg F., a viscosity at 150 C of 200-400 cPs, and an acid number of 40-50 available from SSI Chusei, Inc located in Pasadena, Tex.

"A-C™ 596" is a propylene maleic anhydride copolymer available from Honeywell Specialty Adhesives.

"Irganox™ 1010" is a hindered phenolic antioxidant available from BASF SE Corporation located in Ludwigshafen, Germany.

"Fiber tear" describes the bond strength of the adhesive to the substrate and was measured at room temperature (RT) and −18° C. Fiber tear is a visual measurement as to the amount of paper substrate fibers that are attached to a bond after the substrates are torn apart. 100% fiber tear means the adhesive is stronger than the substrate and 100% of the adhesive is covered in substrate fibers. 0% fiber tear means the adhesive does not bond at all and simply pops off the substrate. Fiber tear was determined by bonding together substrates with the adhesive after the molten adhesive (180° C.) has been dropped onto one of the substrates with an eye dropper. The second substrate was placed on top of the adhesive, and a 500 g weight was placed on top of the second substrate for even application. The adhesive was allowed to cool at the referenced temperature for at least one hour. The substrates were then torn apart and the adhesive was inspected for fiber tear.

"Set time" is defined as the minimal holding time to build bond cohesion requiring more than 10 kg force to break the bond. Set time was determined by bonding together substrates with the adhesive after the molten adhesive (180° C.) has been dropped onto one of the substrates with an eye dropper. The second substrate was placed on top of the adhesive, and a 500 g weight was placed on top of the second substrate for even application. After a predetermined interval of time the second substrate is removed and checked for fiber tear. If no fiber tear was found, a longer interval of time was tried. This continued until fiber tear is found. This length of time was reported as the set time.

"Open time" is defined as the maximum open time after which it remains possible to build a bond stronger than 10 kg force. Open time was determined by bonding together substrates with the adhesive after the molten adhesive (180° C.) has been dropped onto one of the substrates with an eye dropper. The second substrate was placed on top of the adhesive, and a 500 g weight was placed on top of the second substrate for even application. The bonded specimen was examined to determine the longest time period, between application of the adhesive to one surface and mating with a second surface, which allows at least 50% fiber tear.

TABLE 1

| Formulations (%) | A (Ref) | B (Ref) | C | D | E | F |
|---|---|---|---|---|---|---|
| PBE1 | | | | 90 | 95 | |
| PBE2 | | | | 90 | | 95 |
| Linxar ™ 127 | | 90.9 | | | | |
| Escorene ™ UL 40028 | 20 | | | | | |
| Escorene ™ UL 02528 | 20 | | | | | |
| Parrafinic wax, 68° C. mp | 10 | | | | | |
| Sasolwax ™ C80 | | 5 | | | | |
| Sasolwax ™ H1 | 10 | | 5 | 5 | | |
| Milliken ™ HPN 20e | | | | | 600 ppm | 600 ppm |
| Escorez ™ 2206LC | 40 | | | | | |
| MAPP 40 | | 3.2 | | | | |
| A-C ™ 596 | | | 5 | 5 | 5 | 5 |
| Irganox ™ 1010 | 0.5 | 0.9 | 0.5 | 0.5 | 0.5 | 0.5 |
| Set-Time (s) | 0.8 | 0.8 | 1.3 | 1.0 | 0.8 | 0.8 |
| Open-Time (s) | 11.2 | 17.0 | 25.0 | 15.0 | 25.0 | 13.0 |
| % Fiber-tear (RT) | 91 | 97 | 17 | 75 | 96 | 98 |
| % Fiber-tear (−18° C.) | 3 | 87 | 0 | 29 | 95 | 97 |
| Viscosity @ 160° C. (mPas) | 3710 | 1300 | 1820 | 1330 | 2340 | 1720 |
| Viscosity @ 175° C. (mPas) | 2470 | 900 | 1260 | 913 | 1600 | 1170 |

As can be seen in TABLE 1, the compositions that included the nucleating agent (compositions E and F), exhibited set time performances equal to that of the desired performance benchmarks. Notably, such performance was achieved without using a Fischer-Tropsch wax and using higher polymer loadings. Open time and fiber tear performance were also exceptional for compositions E and F.

Figure 2:
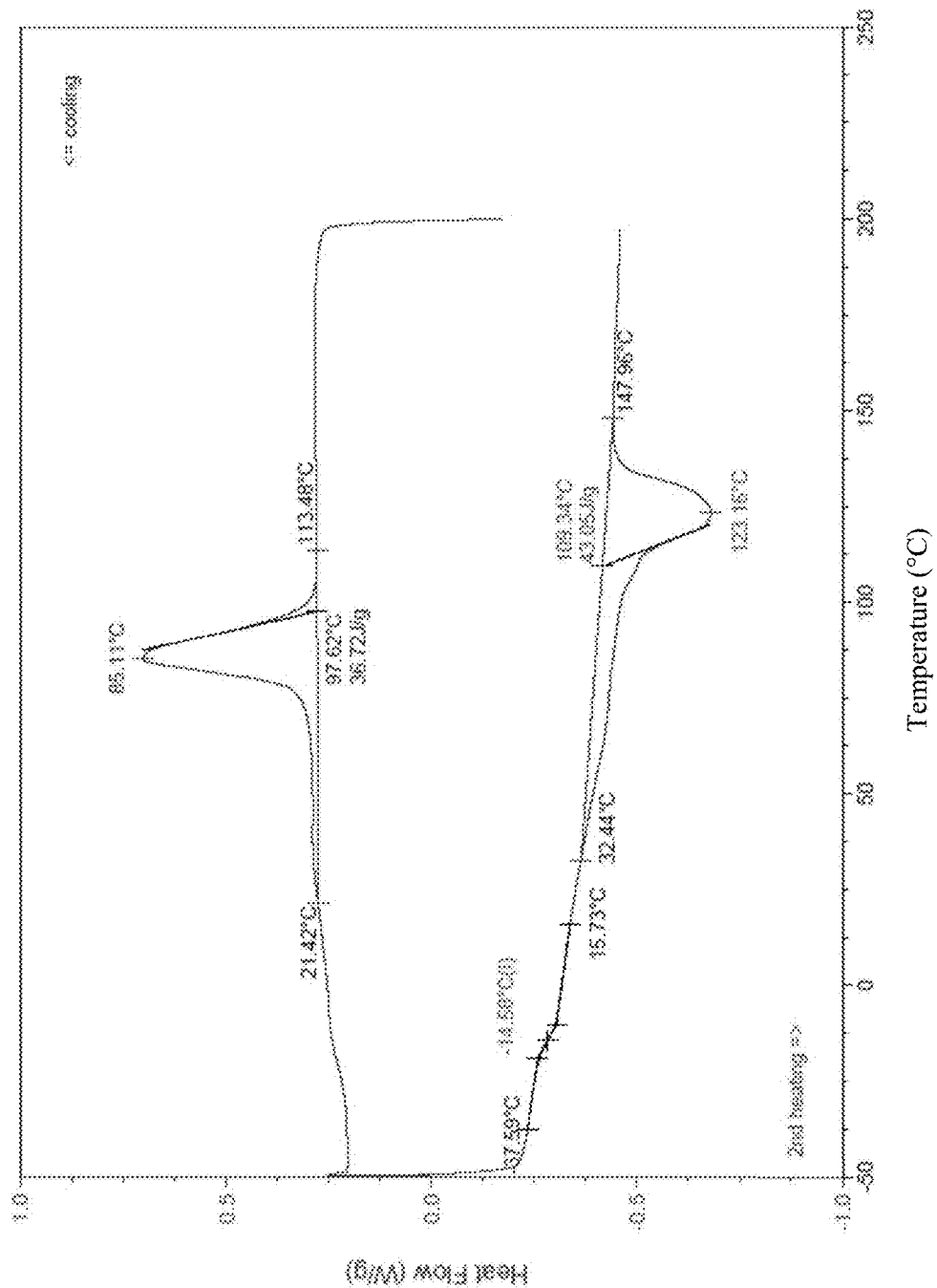
FIG. 2 is a graphical depiction illustrating a differential scanning calorimetry cooling curve for Composition F of Table 1.
Figure 3:
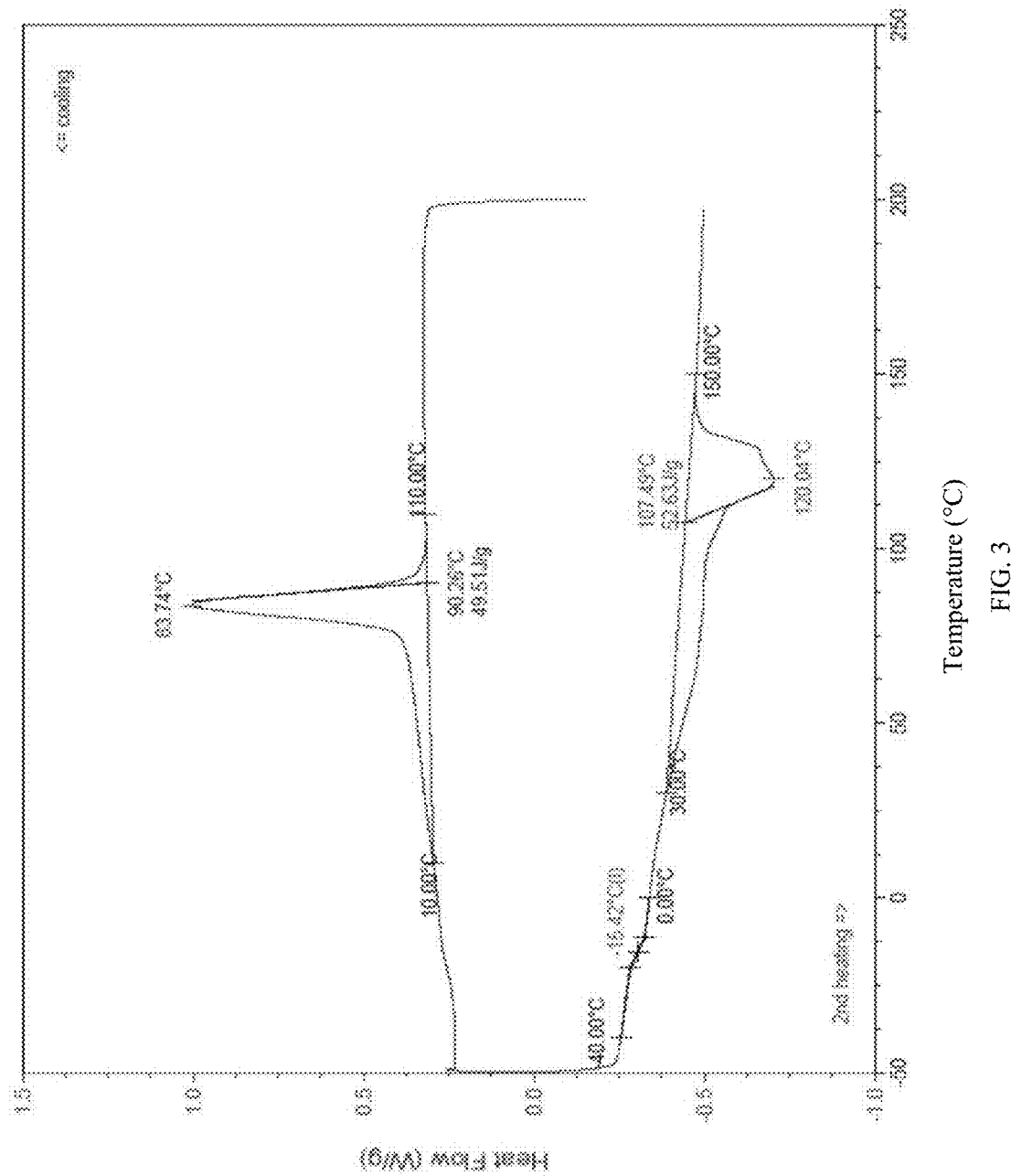
FIG. 3 is a graphical depiction illustrating a differential scanning calorimetry cooling curve for Composition F of Table 1.

Peeling force as a function of application time for each of the adhesive blends is illustrated in FIG. 1. As can be seen in FIG. 1, the adhesive compositions comprising a nucleating agent build up strength quickly at about 0.7 seconds after application. It is believed that this phenomenon is effected by the crystallization of the organic component of the metal salt as the adhesive composition cools, which in turn promotes the crystallization and solidification of the base polymer of the adhesive composition starting at sites adjacent to the nucleating agent as the adhesive composition cools. Accordingly, the presence of the nucleating agent may increase the onset crystallization temperature of the polyolefin composition, e.g., by at least 2° C., 3° C., 5° C., or 7° C. relative to the adhesive composition in which the nucleating agent is absent. As illustrated in FIGS. 2 and 3, the presence of the nucleating agent in Composition F increased the onset crystallization temperature of the composition (relative to Composition D) to 97.62° C. from 90.26° C. In any embodiment, the nucleating agent may be provided in an amount effective to increase the onset crystallization temperature of the polyolefin composition, e.g., by at least 2° C., 3° C., 5° C., or 7° C. relative to the adhesive composition in which the nucleating agent is absent.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. An adhesive composition comprising:
a polyolefin composition comprising a homopolymer of propylene or a copolymer of propylene and ethylene or a $C_4$ to $C_{10}$ alpha-olefin; a nucleating agent effective for decreasing the set time for the adhesive composition by at least 10% in comparison to an otherwise identical adhesive composition in which the nucleating agent is absent;
wherein the adhesive composition has a Dot T-Peel of 1 Newton or more on Kraft paper;
wherein the polyolefin composition comprises a blended multi-modal polymer comprising a first polymer and a second polymer, wherein the first polymer has a heat of fusion of about 65 J/g to about 85 J/g and the second polymer has a heat of fusion of about 10 J/g to about 30 J/g.

2. The adhesive composition of claim 1, wherein the nucleating agent is a metal salt.

3. The adhesive composition of claim 1, wherein the nucleating agent is an organic compound having a crystallization temperature greater than the crystallization temperature of the polyolefin composition.

4. The adhesive composition of claim 1, wherein the nucleating agent is effective to increase the onset crystallization temperature of the polyolefin composition relative to the adhesive composition in which the nucleating agent is absent.

5. The adhesive composition of claim 1, wherein the nucleating agent is effective to increase the onset crystallization temperature of the polyolefin composition by at least 2° C. relative to the adhesive composition in which the nucleating agent is absent.

6. The adhesive composition of claim 1, wherein the nucleating agent is selected from the group consisting of sodium benzoate, talc, glycerol alkoxide salts, cyclic carboxylic acid salts, bicyclic carboxylic acid salts, glycerolates, and hexahydrophtalic acid salts.

7. The adhesive composition of claim 1, wherein the nucleating agent comprises a salt of bicyclo[2.2.1]heptane dicarboxylate.

8. The adhesive composition of claim 1, wherein the adhesive composition comprises about 25 wt % wax or less.

9. The adhesive composition of claim 1, wherein the adhesive composition comprises about 5 wt % wax or less.

10. The adhesive composition of claim 1, wherein the adhesive composition comprises substantially no wax.

11. The adhesive composition of claim 1, wherein the polyolefin composition comprises a copolymer of propylene and ethylene.

12. The adhesive composition of claim 1, wherein the first polymer is a copolymer of propylene and ethylene or a $C_4$ to $C_{10}$ olefin; and wherein the second polymer is a copolymer of propylene and ethylene or a $C_4$ to $C_{10}$ olefin.

13. The adhesive composition of claim 1, wherein the first polymer and second polymer have a difference in heat of fusion of about 20 J/g or more.

14. The adhesive composition of claim 1, wherein the difference in heat of fusion between the first polymer and second polymer is about 30 J/g or more.

15. The adhesive composition of claim 1, wherein the nucleating agent is present in an amount of 200 to 5000 ppm.

16. An adhesive composition comprising:
a polyolefin composition comprising a homopolymer of propylene or a copolymer of propylene and ethylene or a $C_4$ to $C_{10}$ alpha-olefin;
a nucleating agent comprising an inorganic solid particle or an organic component having a crystallization temperature greater than that of the polyolefin composition;
wherein the adhesive composition has a Dot T-Peel of 1 Newton or more on Kraft paper;
wherein the polyolefin composition comprises a blended multi-modal polymer comprising a first polymer and a second polymer, wherein the first polymer has a heat of fusion of about 65 J/g to about 85 J/g and the second polymer has a heat of fusion of about 10 J/g to about 30 J/g.

17. The adhesive composition of claim 16, wherein the nucleating agent is present in an amount of 200 to 5000 ppm.

18. An adhesive composition comprising:
a polyolefin composition comprising a homopolymer of propylene or a copolymer of propylene and ethylene or a $C_4$ to $C_{10}$ alpha-olefin;
a nucleating agent effective for decreasing the set time for the adhesive composition in comparison to an otherwise identical adhesive composition in which the nucleating agent is absent, wherein the nucleating agent is an organic metal salt; and
wherein the adhesive composition has a Dot T-Peel of 1 Newton or more on Kraft paper;
wherein the polyolefin composition comprises a blended multi-modal polymer comprising a first polymer and a second polymer, wherein the first polymer has a heat of fusion of about 65 J/g to about 85 J/g and the second polymer has a heat of fusion of about 10 J/g to about 30 J/g.

19. The adhesive composition of claim 18, wherein the nucleating agent is present in an amount of 200 to 5000 ppm.

* * * * *